United States Patent [19]

Salter, Jr.

[11] 4,071,255

[45] Jan. 31, 1978

[54] FLEXIBLE SEAL ELEMENT WITH REINFORCED DRAIN LABYRINTH

[75] Inventor: Lowell S. Salter, Jr., Shrewsbury, Mass.

[73] Assignee: Morgan Construction Company, Worcester, Mass.

[21] Appl. No.: 731,630

[22] Filed: Oct. 12, 1976

[51] Int. Cl.² .............................................. F16J 15/44
[52] U.S. Cl. ...................................... 277/57; 277/70; 277/95; 277/164
[58] Field of Search ..................... 277/164, 95, 57, 70, 277/96, 96.1, 53

[56] References Cited

U.S. PATENT DOCUMENTS

| | | | |
|---|---|---|---|
| 3,016,251 | 1/1962 | Gilbert | 277/95 |
| 3,038,733 | 6/1962 | Hudson et al. | 277/95 |
| 3,144,280 | 8/1964 | Sorenson | 277/57 |
| 3,330,567 | 7/1967 | Mercer et al. | 277/164 |

*Primary Examiner*—Richard E. Aegerter
*Assistant Examiner*—L. Footland
*Attorney, Agent, or Firm*—Thompson, Birch, Gauthier & Samuels

[57] ABSTRACT

A flexible seal element with a reinforced drain labyrinth is disclosed for use on the outer seal ring of a seal assembly located between a roll end face and a bearing chock in a rolling mill, particularly the bearing chocks of the upper backup roll and the work rolls in a four-high mill. The seal element has a circular body portion adapted to tightly surround the outer seal ring. A first circular lip extends outwardly away from the body portion at an angle relative to the axis thereof to frictionally contact the roll end face. The seal body has a drain opening which is arranged to be aligned radially with a drainage port in the outer seal ring. The drain opening is protected by a second lip which extends outwardly from the seal body in a direction opposite to that of the first mentioned lip. A relatively stiff baffle member is attached to the seal body at a location spaced radially inwardly from the second lip. The baffle member and the second lip cooperate in providing a reinforced drain labyrinth which effectively prevents cooling water, mill scale, etc. from being centrifugally directed upwardly into the bearing from the rotating surfaces of underlying rolls.

5 Claims, 5 Drawing Figures

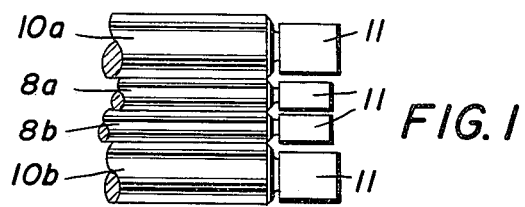
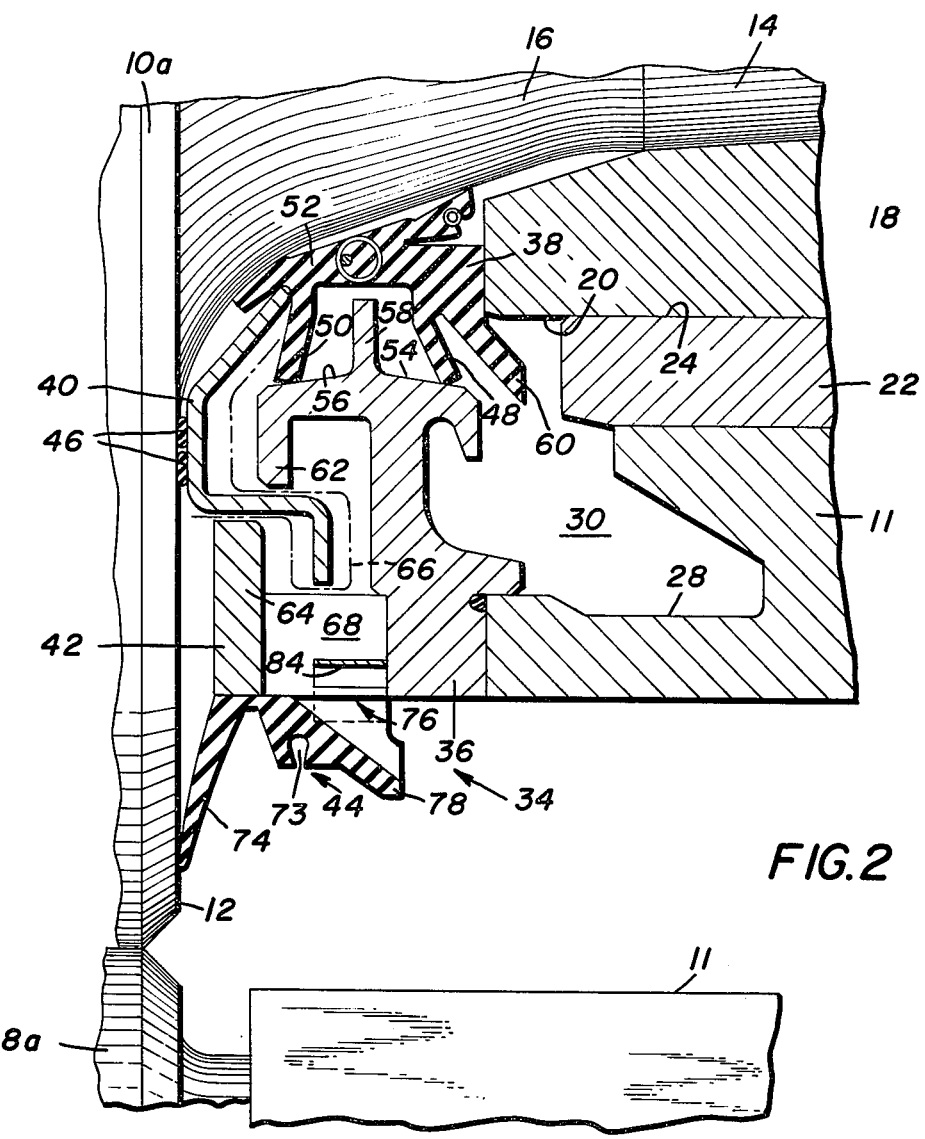

FLEXIBLE SEAL ELEMENT WITH REINFORCED DRAIN LABYRINTH

BACKGROUND OF THE INVENTION

This invention relates generally to the art of seals, and is concerned in particular with flexible seal elements of the type employed as part of seal assemblies located between the roll end faces and the bearing chocks in a rolling mill.

In a typical rolling mill application, a roll neck is journalled for rotation in an oil film bearing. The bearing includes a sleeve keyed or otherwise fixed to the roll neck for rotation therewith. The sleeve is surrounded by and supported within a non-rotatable bushing which is in turn contained in a bearing chock. An oil film is maintained continuously between the sleeve and the bushing during operation of the mill. A seal assembly is located between the roll end face and the bearing chock. The seal assembly functions to prevent loss of oil from the bearing, and also to prevent exterior contaminants such as cooling water, mill scale, etc. from penetrating into the bearing.

In a four-high mill, experience has indicated that the exclusion of contaminants is particularly troublesome with regard to the bearings of the upper backup roll and the work rolls. This is because the downwardly facing drainage ports of their seal assemblies provide openings which can be penetrated by the contaminants being centrifugally thrown off of the rotating surfaces of underlying rolls.

An example of a typical rolling mill seal assembly is that described in U.S. Pat. No. 3,330,567 assigned to the same assignee as that of the present invention. This seal assembly includes a flexible neck seal having a circular body mounted on a tapered transition section of the roll neck, with resilient flanges extending radially outwardly from the seal body. The ends of the resilient flanges are adapted to frictionally contact surrounding shoulders on a non-rotatable seal end plate attached to the bearing chock. Oil is retained in the bearing by the sealing interface between one of the rotating resilient seal flanges and the non-rotatable seal end plate shoulder in contact therewith. Likewise, contaminants are excluded from the bearing by the sealing interface between the other of the rotating resilient seal flanges and its associated seal end plate shoulder.

The seal assembly further includes a rotatable inner seal ring carrying spacers which abut the roll end face at circumferentially spaced locations, and a non-rotatable outer seal ring which cooperates with the inner seal ring to form a sealing labyrinth between the roll end face and the seal end plate. This sealing labyrinth is drained through a drainage port at the bottom of the outer seal ring.

While this type of arrangement has operated for many years in a generally satisfactory manner, under certain conditions, for example where large amounts of liquid coolant are being applied to the work rolls, the sealing labyrinth formed by the inner and outer seal rings has been found to be inadequate, thus necessitating the addition of another flexible seal element to bridge the gap between the roll end face and the outer seal ring. In the past, such additional flexible seal elements have generally taken the form of elongated lightweight flexible extrusions which are cut to length, wrapped around the outer seal ring and held in place thereon by a metal retaining band. Such seal elements do not completely surround the outer seal rings, but rather their ends are spaced to provide a gap at the lower drainage ports to accommodate escape of contaminants from the seal assembly. While the sealing characteristics of such seal elements are by and large satisfactory, they are difficult to mount and dismantle due to the need to employ exterior retaining bands. Moreover, and this is particularly true of the upper backup roll and the work rolls, the gaps at the lower drainage ports fail to prevent contaminants from splashing up from the rotating surfaces of underlying rolls.

Accordingly, an object of the present invention is the provision of an improved flexible seal element for use on an outer seal ring which obviates or at least substantially minimizes the problems mentioned above.

A more specific object of the present invention is the provision of a flexible seal element which has a circular body portion adapted to tightly surround the outer seal ring without the need of a separate retaining band, with a circular lip sealingly contacting the roll end face, and with a drain opening in the body portion arranged to be aligned radially with the drainage port in the outer seal ring, thus allowing free drainage of the sealing labyrinth formed between the inner and outer seal rings.

A further object of the present invention is to prevent or at least substantially minimize entrance of contaminants through the drain opening in the body portion of the flexible seal element by surrounding this drain opening with a second protective lip which cooperates with an interior relatively stiff baffle element to form a labyrinth. The baffle element serves the added function of reinforcing the body portion against distortion. Thus, the drain opening, second protective lip and baffle element cooperate in providing a reinforced drain labyrinth.

SUMMARY OF THE INVENTION

According to the present invention, there is provided a flexible seal element adapted to be mounted on the stationary outer seal ring of a seal assembly located between the roll end face and a lubricated bearing contained in a bearing chock, the outer seal ring being cooperatively arranged with an inner seal ring to form a sealing labyrinth which is drained through a drainage port at the bottom side of the outer seal ring. The flexible seal element has a circular body portion adapted to tightly surround the outer seal ring, preferably without the need of an auxiliary metal retaining band or the like. A first circular lip is integrally formed with and extends outwardly away from the body portion at an angle relative to the axis thereof. The first lip is arranged to sealingly contact the roll end face. The body portion is provided with a drain opening arranged for alignment with the drainage port in the outer seal ring. This permits free drainage of liquid entrapped by the sealing labyrinth formed between the inner and outer seal rings. A second lip surrounds the drain opening in the body portion. The second lip is also integrally formed with and extends outwardly from the body portion in the opposite direction from the first mentioned lip and at an angle relative to the axis of the body portion. The body portion, including both of the aforesaid lips, is preferably formed by molding or extruding from a synthetic rubber material. A relatively stiff baffle member, preferably comprising a metal strip, is located radially inwardly from the second lip. The baffle member has end flanges embedded in the body portion at opposite sides of its drain opening. The baffle member cooperates with the second lip to form a labyrinth which prevents or at least substantially minimizes the possibility of exterior contaminants entering upwardly through the drain opening, while also reinforcing the body portion against distortion in the area of the drain opening.

BRIEF DESCRIPTION OF THE DRAWINGS

A preferred embodiment of the invention will now be described by way of example only, with reference to the accompanying drawings wherein:

FIG. 1 is a partial schematic illustration of a typical four-high installation showing the relative positioning of the work rolls, backup rolls and their respective bearing chocks;

FIG. 2 is a cross-sectional view taken through a seal assembly located between the roll end face and bearing chock of the upper backup roll, with a flexible seal element in accordance with the present invention shown mounted in an operative position on the outer seal ring;

DESCRIPTION OF PREFERRED EMBODIMENT

Figure 5:
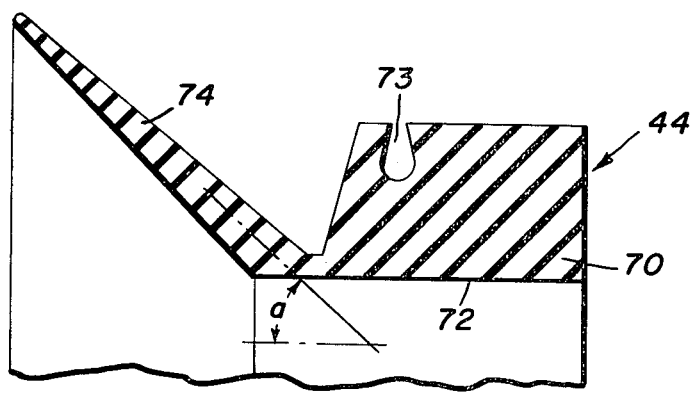
FIG. 5 is a sectional view similar to FIG. 4 taken through the upper portion of the flexible seal element.

This invention is particularly useful for, although not strictly limited to, use on the seal assemblies of the upper backup roll and the work rolls of a four-high mill, where contaminants are most likely to be centrifugally directed upwardly into downwardly facing drainage ports. As schematically depicted in FIG. 1, this type of mill includes cooperating pairs of work rolls 8a, 8b which are rotatably supported by upper and lower backup rolls 10a, 10b. The ends of the work rolls and backup rolls are journalled in oil film bearings contained in bearings chocks 11, the latter being carried by an exterior roll housing (not shown).

The arrangement of the oil film bearing and seal assembly for the upper backup roll 8a, which is typical of that used for all rolls will now be described with reference to FIG. 2. The roll 10a has an end face 12 and a roll neck 14 joined to the roll 10a by an intermediate tapered section 16. The roll neck 14 has mounted thereon a sleeve 18 having a cylindrical outer bearing surface 20. The sleeve 18 is fixed to the roll neck 14 by conventional means, for example a key (not shown). Sleeve 18 is journalled for rotation in a fixed bushing 22 having an interior cylindrical bearing surface 24. The bushing 22 is carried within and fixed relative to a roll chock 11. It will thus be seen that sleeve 18 rotates with the roll, while the chock 11 and the bushing 22 are stationary. During operation of the mill, oil in flooding quantity is fed continuously between the bearing surfaces 20 and 24. A circular extension 28 of the roll chock 11 provides a sump 30 at its bottom portion in which the oil emerging from the bearing is continuously collected. The oil is drawn away from the sump through a suitable piping connection (not shown) to be recycled in a conventional manner back to the bearing surfaces.

During operation of the mill, a liquid coolant is continuously flooded over the work and the backup rolls. The coolant normally picks up particulate matter such as dirt, mill scale, etc. The liquid coolant, mill scale, dirt, etc. will hereinafter be collectively referred to as "contaminants". A seal assembly generally indicated at 34 is located between the roll end face 12 and the bearing chock 11, its function being to retain lubricating oil in the bearing, while preventing the contaminants from penetrating into the bearing.

In the example herein being employed for illustrative purposes, the seal assembly 34 is made up of the five main components, i.e., a circular seal end plate 36; a flexible neck seal 38; an inner seal ring 40; an outer seal ring 42; and another flexible seal element 44 in accordance with the present invention. The seal end plate 36 and the outer seal ring 42 are fixed relative to the bearing chock 11. The inner seal ring 40, which carries spacers 46 in contact with the roll end face at circumferentially spaced locations, and the neck seal 38, both rotate with the roll. The neck seal 38 has resilient flanges 48, 50 which extend radially outwardly from the seal body 52. The ends of the flanges 48, 50 are arranged to frictionally contact shoulders 54, 56 on the seal end plate, the latter having a rigid flange 58 which extends radially inwardly between the flexible flanges 48, 50. Oil is retained in the bearing by the combined action of a resilient flinger 60 on the neck seal and the frictional sealing interface between flange 48 and shoulder 54.

The inner seal ring 40 cooperates with the seal end plate 36 of which flange 62 forms a part and another flange 64 on the outer seal ring 42 to provide a sealing labyrinth (indicated diagrammatically by dot-dash line 66) which is drained by a drainage port 68 at the lowermost side of outer seal ring 42. The sealing labyrinth 66 and the frictional sealing interface between flange 50 and shoulder 56 work in combination with the flexible seal element 44 of the present invention to exclude contaminants from the bearing.

Figure 3:
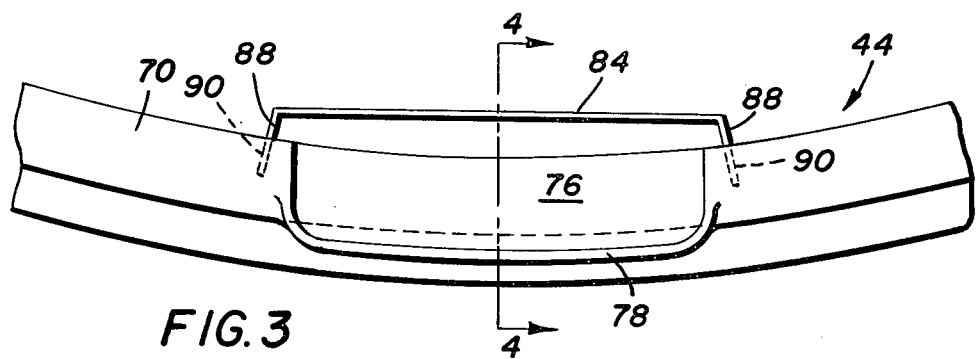
FIG. 3 is a partial end view (looking from right to left in FIG. 2) of the lower portion of the flexible seal element.

With the exception of the flexible sealing element 44, the components described above are well known to those skilled in the art and hence do not form part of the present invention. The flexible seal element 44 which comprises the present invention will now be described in detail with reference to FIGS. 2–4.

Flexible seal element 44 includes a circular body portion 70 which is adapted to tightly surround the outer seal ring 42. Preferably, the body portion is provided with an interior cylindrical surface 72 having a diameter slightly less than the outer diameter of the outer seal ring 44, thus making it necessary to stretch the body portion 70 slightly when mounting it on the outer seal ring. This will insure adequate sealing between the seal element 44 and the outer sealing ring 42, while at the same time preventing the seal element from rotating relative to the outer seal ring. These objectives can be achieved without the need to resort to separate metal retaining bands, which complicate assembly and disassembly. However, in the event that additional retaining means is required, an optional circumferential groove 73 can be provided for receiving a spring or cable (not shown). A first flexible circular lip 74 is integral with and extends outwardly away from the body portion 70 at an angle "a" relative to the axis thereof. As shown in FIG. 1, when the seal element 44 is mounted in place on the outer sealing ring 42, the lip 74 is arranged to be deflected outwardly in frictional sealing contact with the roll end face 12. It will thus be seen that the lip 74 bridges the gap between the roll end face 12 and the outer seal ring 42, thereby serving as a means for deflecting a major portion of the contaminants away from the sealing labyrinth 66.

Unavoidably, however, some of the contaminants will pass between the lip 74 and the roll end face 12. Such contaminants will penetrate into the sealing labyrinth 66 where they will eventually be turned back by either the surface forming the labyrinth or by the sealing interface between flange 50 and shoulder 56. After being turned back, the contaminants will drain downwardly through drainage port 68. To accommodate such drainage, the seal element 44 is provided with a drain opening 76 arranged to be aligned with the drainage port 68 in the outer seal ring 42.

The exit end of drain opening 76 is surrounded by a second protective lip 78 extending outwardly from the body portion 70 in a direction opposite to that of lip 74. Lip 78 also forms an angle "b" with the axis of the body portion. The drain opening 76 is defined in part by an inclined or sloping surface 80 leading from interior cylindrical surface 72 to the outer edge 82 of lip 78. The slope of surface 80 serves to direct exiting contaminants away from the roll end face 12.

The body portion 70 and the lips 74 and 78 are preferably integrally fabricated, as by molding or extrusion, from a flexible resilient material such as for example synthetic rubber.

Figure 4:
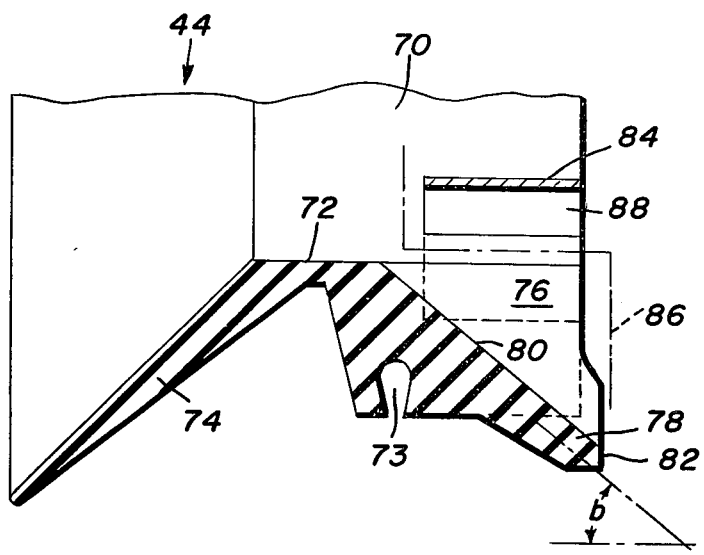
FIG. 4 is a sectional view taken along lines 4—4 of FIG. 3.

In order to further assist in preventing contaminants from splashing upwardly through drain opening 76, a baffle member 84 is arranged to overlie and to cooperate in a radially inwardly spaced relationship with lip 82 to form a sealing labyrinth schematically depicted in FIG. 4 by the dot-dash line 86. The baffle member 84 is preferably fabricated from a relatively stiff metal strip with downturned end flanges 88 embedded as at 90 in the body portion 70 on opposite sides of the drainage port 76. In addition to providing part of the sealing labyrinth 86, the baffle member 84 also reinforces the body portion 70 against distortion in the area of reduced material thickness at the drain opening 76. The reinforcing function of the baffle member 84 is particularly important due to the fact that at this location the body portion 70 lacks radial support from the outer seal ring 40 due to the latter being cut away to provide drainage port 68.

It will thus be seen that the present invention provides a seal element 44 having a circular body portion which can be tightly mounted on the outer seal ring 42 without the need of separate retaining bands. A drain opening 76 is provided in the seal body. The drain opening is protected by a lip 78 and a baffle 84 which together create a sealing labyrinth 86 which effectively excludes contaminants being directed centrifugally upwardly from underlying rolls. The baffle 84 serves the added function of a reinforcing element, which is particularly important due to the fact that at this location, the circular body portion 70 is weakened by the provision of the drainage opening 76, and the body portion 70 is not fully supported radially by the outer seal ring.

It is my intention to cover all changes of and modifications to the embodiment herein chosen for purposes of disclosure which do not depart from the spirit and scope of the invention.

I claim:

1. In a rolling mill wherein the neck of a roll is rotatably supported in a lubricated bearing contained in a bearing chock, with a seal assembly located between the roll end face and the bearing chock for retaining lubricant in the bearing while excluding contaminants such as cooling water, dirt and mill scale therefrom, the said seal assembly including a stationary outer seal ring spaced from the roll end face with a drainage port therein, the improvement comprising: a flexible seal element having a circular body portion adapted to tightly surround the outer seal ring, a circular first lip integral with and extending outwardly away from said body portion at an angle relative to the axis thereof, said lip being arranged to sealing contact the roll end face, a drain opening in said body portion arranged for alignment with said drainage port, a second lip on said body portion surrounding said drain opening, and a baffle member attached to said body portion, said baffle member cooperating in radially spaced relationship with said second lip to provide a sealing labyrinth at said drain opening, said baffle member being sufficiently stiff to also reinforce said body portion against distortion at said drain opening.

2. The seal element as claimed in claim 1 wherein said second lip extends outwardly from said body portion in the opposite direction from said first mentioned lip and at an angle relative to the axis of said body portion.

3. The seal element as claimed in claim 2 wherein said body portion is provided with a cylindrical interior surface, and wherein said drain opening is defined in part by a sloping surface leading outwardly from said cylindrical inner surface to the outer edge of said second lip.

4. The seal element as claimed in claim 2 wherein said baffle member is spaced radially inwardly from said second lip.

5. The seal element as claimed in claim 4 wherein said body portion and said lips are integrally formed from a flexible resilient synthetic rubber material, and wherein said baffle member is comprised of an elongated metal strip with end flanges embedded in said body portion, said baffle member being arranged to reinforce said body portion against distortion at said drain opening.

* * * * *